(12) United States Patent
Scobey et al.

(10) Patent No.: US 6,389,188 B1
(45) Date of Patent: May 14, 2002

(54) HYBRID WAVELENGTH SELECTIVE OPTICAL ROUTER AND SWITCH

(75) Inventors: Michael A. Scobey; Robert W. Hallock, both of Santa Rosa, CA (US)

(73) Assignee: Optical Coating Laboratory, Inc., Santa Rosa, CA (US)

(*) Notice: Subject to any disclaimer, the term of this patent is extended or adjusted under 35 U.S.C. 154(b) by 0 days.

(21) Appl. No.: 09/511,693

(22) Filed: Feb. 23, 2000

Related U.S. Application Data

(60) Provisional application No. 60/121,420, filed on Feb. 23, 1999, and provisional application No. 60/150,398, filed on Aug. 23, 1999.

(51) Int. Cl.⁷ .................................................. G02B 6/35
(52) U.S. Cl. ........................... 385/18; 385/16; 385/24; 385/37
(58) Field of Search ........................ 385/15, 16, 18, 385/24, 37, 47, 48

(56) References Cited

U.S. PATENT DOCUMENTS

| | | | |
|---|---|---|---|
| 4,626,066 A | * 12/1986 | Levinson | 350/96.18 |
| 5,422,968 A | 6/1995 | Hanatani et al. | 385/24 |
| 5,425,115 A | * 6/1995 | Wagner | 385/16 |
| 5,436,986 A | 7/1995 | Tsai | 385/16 |
| 5,504,609 A | 4/1996 | Alexander et al. | 359/125 |
| 5,532,864 A | 7/1996 | Alexander et al. | 359/177 |
| 5,557,442 A | 9/1996 | Huber | 359/179 |
| 5,845,023 A | * 12/1998 | Lee | 385/33 |
| 5,859,717 A | 1/1999 | Scobey et al. | 359/124 |
| 5,889,904 A | * 3/1999 | Pan et al. | 385/24 |
| 5,930,016 A | 7/1999 | Brorson et al. | 359/127 |
| 5,943,454 A | 8/1999 | Aksyuk et al. | 385/22 |
| 5,953,141 A | 9/1999 | Liu et al. | 359/124 |
| 5,974,207 A | 10/1999 | Aksyuk et al. | 385/24 |
| 6,023,542 A | * 2/2000 | Pan et al. | 385/24 |
| 6,118,912 A | * 9/2000 | Xu | 385/24 |

FOREIGN PATENT DOCUMENTS

| | | | |
|---|---|---|---|
| WO | WO 99/13607 | 3/1999 | H04J/14/02 |
| WO | WO 99/14879 | 3/1999 | H04J/14/00 |
| WO | WO 99/38348 | 7/1999 | H04Q/11/00 |
| WO | WO 99/41635 | 8/1999 | G02F/1/13 |
| WO | WO 99/59281 | 11/1999 | H04J/14/02 |

OTHER PUBLICATIONS

Senior, J., Devices for Wavelength Multiplexing and Demultiplexing, IEEE Proceedings, vol. 136, Pt. J, No. 3, pp. 183–202 (Jun. 1989).

* cited by examiner

*Primary Examiner*—John D. Lee
*Assistant Examiner*—Jennifer Doan
(74) *Attorney, Agent, or Firm*—Scott W. Hewett; Edward S. Sherman

(57) ABSTRACT

An optical assembly including a wavelength selective filter (114) in combination with a collimator (112). An input port is configured to provide an optical signal containing a plurality of optical channels to the collimator and then to the wavelength selective filter. The hybrid selective optical router allows a channel or segment of adjacent channels (118) to be dropped from the optical signal with minimal signal degradation to the dropped or expressed channels. In a particular embodiment, a pair of wavelength selective routers (300, 326) are combined with a switched optical directing element (308) and other components to provide an ADD/DROP switch. In a further embodiment, an ADD/DROP switch is provided with a single movable mirror, and no fixed mirrors.

13 Claims, 7 Drawing Sheets

HYBRID WAVELENGTH SELECTIVE OPTICAL ROUTER AND SWITCH

RELATED APPLICATIONS

This application claims the benefit of the filing dates for U.S. Provisional patent application No. 60/121,420 entitled HYBRID FILTER SWITCH by Michael Scobey and Robert Hallock, filed Feb. 23, 1999, and U.S. Provisional patent application No. 60/150,398 entitled HYBRID OPTICAL ADD/DROP MULTIPLEXING DEVICES by Michael Scobey and Robert Hallock, filed Aug. 23, 1999; the disclosures oh which are hereby incorporated by reference for all purposes.

This application is being concurrently filed with U.S. Utility Patent Application No. 09/511,695, entitled OPTICAL WEDGE SWITCH by Yiqiang "Steve" Li, the disclosure of which is hereby incorporated by reference for all purposes.

BACKGROUND OF THE INVENTION

1. The Field of the Invention

This present invention relates to optical communication systems. More articularly, embodiments of the present invention relate to routing channels of wavelength division multiplexed (WDM) optical communication systems.

2. Relevant Technology

Optical communication systems are becoming a substantial and fast-growing constituent of traditional communication networks. The use of optics in communication technologies is particularly desirable because of the immense potential bandwidth available for conveying information. The increase in bandwidth is due primarily to the higher frequency of optical signals compared to traditional wire or radio communication mediums. Thus, optics are especially suitable for use in such communications applications as telecommunications, cable television systems, local area networks (LANs), and the like.

Typically, optical communication systems use some form of waveguide, such as an optical fiber to transfer the information carrying light signal from one location to another, although some systems, such as satellite-to-satellite systems, may directly beam signals from one location to another. A waveguide is simply a device that confines and guides a propagating electromagnetic wave, such as light. An optical fiber typically includes a core section and a cladding section that allows efficient transmission of light over relatively long distances, such as tens or even hundreds or kilometers, depending on the strength of the optical signal and attenuation of the waveguide.

While the information carrying capacity of optical communication systems is high, it remains a primary objective—as is the case with most communications technologies—to increase the amount and rate at which information can be transferred over the communications medium, such as an optic fiber. There are however a number of factors that must be taken into account when an increase in bandwidth is desired. For example, it is not cost efficient to have a separate wire or waveguide for each individual signal. Nor is it reasonable to continuously add new channels to accommodate and provide additional bandwidth.

One solution to the bandwidth problem includes laying more fiber-optic cables to meet the increasing demand for bandwidth. Unfortunately, this approach is expensive and time consuming. Moreover, the approach is not always practical due to physical constraints.

Other approaches for increasing bandwidth involve utilizing the channel more efficiently. For example, one approach is to utilizes a technique called time-division multiplexing ("TDM"). This technique allows information to be conveyed from multiple sources on a single light signal. TDM consists of placing multiple signals in one wire or waveguide by separating portions of each signal by a certain amount of time. Each complete individual signal can then be recovered by sampling at the particular time slot allocated to that signal. Unfortunately, this technique does not sufficiently solve the bandwidth problem; certain interference effects and transfer speed limit the capacity of a TDM system to transfer multiple signals on the same wire or waveguide.

Another technique used for increasing the bandwidth of optical communication systems is referred to as wavelength division multiplexing ("WDM"). This technique increases the capacity of an existing optic waveguide by using multiple wavelengths of a light signal to carry multiple signal channels. This technique can greatly increase the capacity and bandwidth of installed fiber optic networks. In practice, a WDM system typically employs multiple optical signals or channels from many sources. Each of these signals is assigned a particular channel wavelength band, or segment of the total spectrum. The multiple optical signal channels are then multiplexed, with a WDM multiplexer, to form single output optical signal, which can then be transmitted over a single waveguide.

It is desirable to demultiplex the optical signal into selected channels or groups of channels to route the channels to a variety of destinations. Exemplary WDM optical communication systems are described in U.S. Pat. Nos. 5,504,609; 5,532,864 and 5,557,442, the disclosures of which are incorporated herein by reference.

In many applications, such as optical LANs, cable television subscriber systems, and telecommunications networks, there is a need to selectively change the route of one or more channels of a multiplexed optical signal to different destinations. Such routing occurs when optical channels are sent to or withdrawn from an optical transmission line e.g., for sending optical channels between a terminal and an optical bus or routing long distance telecommunications traffic to individual cities.

However, this ability to provide "wavelength selective routing", i.e., the ability to select and redirect one or more channels from a common WDM signal, has not been satisfactorily addressed. For example, existing solutions may first convert the signal from the optical wavelength domain to electrical signals, before they are selected/redirected. This process is not extremely efficient, and can introduce a bottleneck in the communications system. Moreover, repeated conversion of the optical signals to the electrical domain and back again can introduce signal error.

Also, selective routing of signals is not easily achieved, especially in a "dense" WDM ("DWDM") communication system, where channels can have a center frequency separation of 100 GHz (or a wavelength separation of about 0.8 nm) or less. This is largely due to limitations in conventional optical switches, which generally switch all wavelengths (channels) at once. Under this approach, to selectively route an individual optical signal channel, the entire signal is demultiplexed by a demultiplexer into all the desired channels or sets of channels. After the signal is demultiplexed, optical switches are used to selectively direct the channel(s) toward its intended destination. To effectively utilize the total bandwidth of each route, the signals are typically then re-multiplexed after they are routed. As such, each potential route requires a separate demultiplexer, multiplexer, and optical switches for each optical channel. This placement of multiplexers and demultiplexers in series results in signal loss from a phenomena known as bandwidth narrowing. Additional signal losses (such as insertion losses, polarization mode dispersion, and ripple) from each of these components will accumulate, thus imposing cost penalties from required amplifiers to boost the signal and/or limits on the interconnection density in the network fabric. These sorts of inefficiencies are especially problematic in a DWDM network, and thus conventional WDM multiplexer and demultiplexer devices generally consume a large portion of a systems attenuation loss budget, and may suffer from additional performance deficiencies.

Therefore, and especially in connection with new and developing standards, optical routers and switches are needed that offer reliable and stable performance over a variety of environmental conditions. More particularly, it would be desirable to provide an optical switch that can select (i.e., drop or add) one or more optical channels. Preferably, such selection would be accomplished by wavelength demultiplexing/multiplexing only the selected optical channels, without affecting the nonselected optical channels. Also, it would be an advancement in the art to provide an optical switch that is small in size, is reliable, and which has only a single point of failure. In addition, the switch should have low insertion loss and adjacent channel tilt on all channels, and should be of a form that is easily interconnected or cascaded.

OBJECTS AND BRIEF SUMMARY OF EMBODIMENTS OF THE INVENTION

Given the foregoing problems and shortcomings in the prior art, it is an overall objective of the present invention to provide an optical device that provides the ability to switch selective wavelengths. A related objective is to provide an optical device that is capable of routing one or more selected channels in a given incoming wavelength multiplexed optical signal, while at the same time permiting the non-selected channels to pass without significant attenuation, signal loss, polarization mode dispersion, ripple, or bandwidth narrowing.

These and other objectives are provided by way of embodiments of the present invention, which is generally directed to an optical device that routes and selects one or more channels from a WDM signal and that does not significantly affect the unselected channels. In presently preferred embodiments, a wavelength selective optical router and switch selects one or more predetermined optical signal channels from a plurality of wavelength division multiplexed optical signal channels, and selectively routes the selected signal channel to one of a multiple number of "drop" ports. At the same time, all the other "non-selected" channels are reflected to a common port before passing through the switch. Moreover, the non-selected channels pass without significant attenuation or loss.

According to one embodiment of the invention, the wavelength selective optical switch has four ports, including one input port, an express port, an output port, and a DROP port. The optical switch receives an incoming signal comprised of several optical signal channels at the input port. One or more of these optical signal channels are then selected when passed through a wavelength selective filter integrated with an input "flashlight" that includes a ferrule for holding the optical fibers in relation to a collimator, such as a GRIN lens.

The filter passes a channel or set of adjacent channels through the device and this portion of the input signal is considered "dropped" from the remaining incoming optical signal channels.

The dropped channel can be switched to one of two selected ports with an optical routing element, such as a movable mirror. For example, in a first switch state, the "dropped" channel can be transmitted unobstructed from the input filter to the output port (i.e. not dropped). In the second switch state, the mirror is moved into the optical path of the selected (dropped) channel to deflect the light beam towards the DROP port.

In a further embodiment, a common port, ADD port, and wavelength selective output filter are added. The wavelength selective output filter transmits the switched wavelengths and reflects a remaining portion (typically arriving at the common port in addition to any signals provided by the ADD port) to the output port.

The present invention solves or substantially mitigates the problems associated with combining conventional optical switches and wavelength division multiplexer and de-multiplexer devices, by providing higher performance, compact size and stable performance over many environmental conditions at reasonable costs.

These and other features, aspects, and advantages of present invention will become better understood with reference to the following drawings, description and appended claims.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF PRESENTLY PREFERRED EMBODIMENTS

The present invention is directed to an optical device that selectively routes and or switches a selected channel(s) from a WDM signal. The present invention performs this function in a novel way that substantially preserves the signal quality of the nonselected channels by efficiently reflecting the non-selected channels before introducing substantial insertion loss, including polarization dependant loss, from a switched optical element, such as a mirror.

Figure 1:
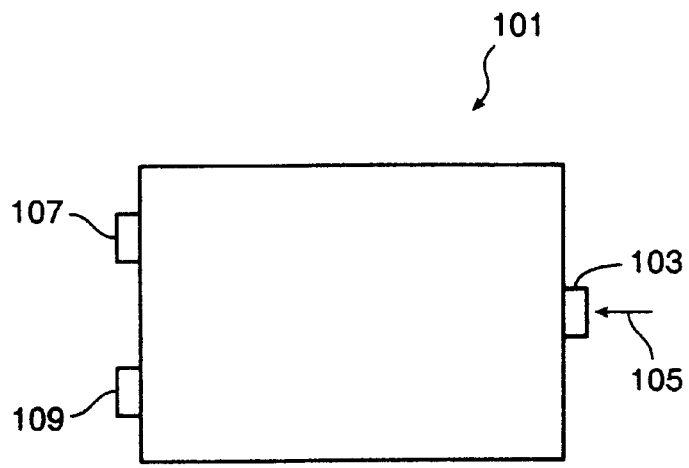
FIG. 1 is a simplified diagram illustrating the ports of an optical router.

FIG. 1 is a simplified representation of an optical router 101 according to an embodiment of the present invention. An input port 103 is configured to receive an optical signal, represented by an arrow 105. The optical signal carries a plurality of WDM channels. A wavelength selective filter (not shown) is optically coupled between the input port and each of the two output ports 107, 109. The input port 105 and output ports 107, 109 can be optically coupled to a variety of optical elements, such as optical fibers, thin-film optical waveguides, photo-diodes, photo-detectors, and light amplifiers, for example. Those skilled in the art will recognize that different ports might be optically coupled to different elements, such as the input port being coupled to a photo-diode, one of the output ports being coupled to a photo-detector, and the other output port being coupled to a optic fiber.

Figure 2:
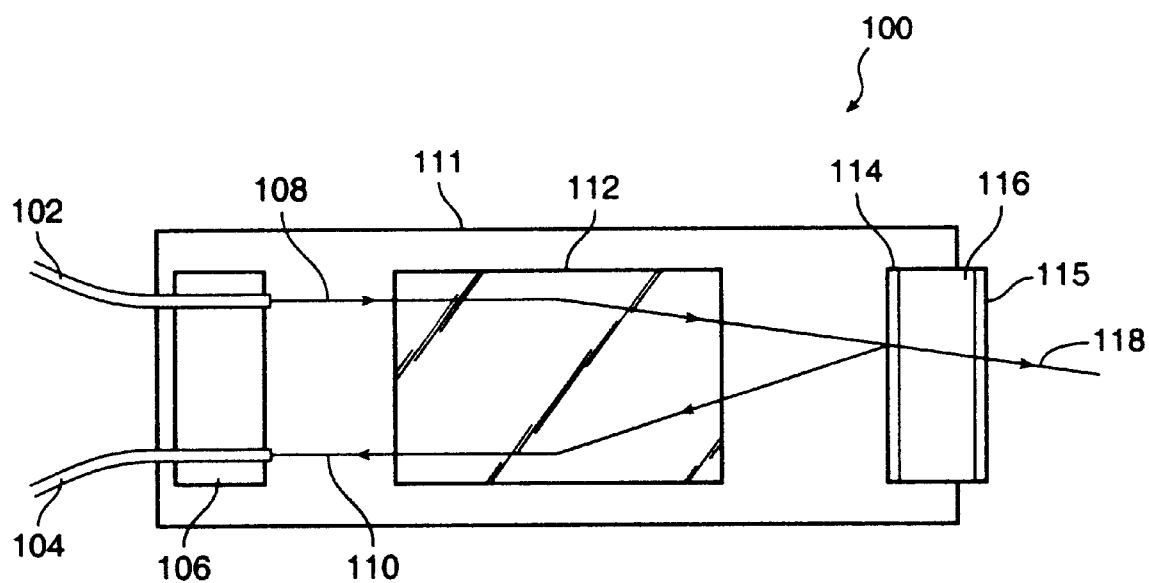
FIG. 2 is a simplified diagram of a hybrid wavelength selective router according to an embodiment of the present invention.

FIG. 2 illustrates a hybrid input flashlight assembly 100 according to an embodiment of the present invention. The input flashlight assembly is referred to herein as a hybrid wavelength selective optical router. This designation derives from the hybrid combination of optical elements that allow a selected spectral segment of an input signal to be routed through the device, passing the remaining spectral portions of the input signal to another port. In a preferred embodiment, the optical components are held in lace in a cylindrical housing 111 (i.e. tube) with epoxy adhesive or other cement. The cylindrical housing provides a robust assembly sufficiently compact to be used in applications where space is critical, such as satellites.

An input beam 108 is provided on an input fiber 102 held in place by a ferrule 6, which also holds the output fiber 104. The input and output fibers are optically coupled to a collimator 112, such as a GRIN lens. A wavelength selective input filter 116 (hereinafter "input filter"), includes a wavelength selective coating 114 and may include an additional anti-reflective coating 115, may be integrated with the collimator to provide a low-loss optical router component. The input filter transmits a selected segment of the input signal, the selected segment being shown as the dropped beam 118. It is understood that the two sides of the filter may be reversed (i.e. the filter may be flipped 180 degrees with respect to the collimator, and additional coatings, such as a second anti-reflective coating (not shown) on the wavelength-selective filter surface, may be included.

A remaining, or express, portion 110 of the input signal is reflected off the input filter 116 to the output fiber 104. The input fiber 102 and output fiber 104 may be any cable capable of containing multiple wavelengths of light such as fiber-optic cable and the like. The ferrule 106, which typically has a center capillary (not shown), is used to mechanically attach the input and output fibers 102 and 104 to the input flashlight. In addition, the ferrule 106 aligns the fibers for operation with the collimator 112 and the input filter 116, as well as other elements of an optical router. Ferrules may be composed of any substantially rigid material such as glass, ceramic, plastic, metal, or fiber-reinforced resin.

It is understood that a light ray is an imaginary representational line that is perpendicular to a propagating wavefront of an optical signal or from a light source. The input 108, dropped 118, and express 110 light rays have different wavelength spectrums, the input spectrum including the dropped and express spectrums. The wavelengths of the individual rays within the input, output and selected beams 108, 110 and 118 are not necessarily in the visible spectrum but have been included in the figure for illustrative purposes. The input, output and selected beams typically have a diameter of only 50 to 1000 microns after collimation; thus the actual flashlight assembly can be made quite compact. Even though the collimated beam(s) is quite narrow, the collimator serves to expand the essentially point light source from a fiber end, for example, to an expanded beam. It would be further understood by those skilled in the art that reversing the direction of the light path(s) would allow the hybrid assembly to add a selected spectrum segment to the output optical signal.

The input filter 116 is preferably a stack of alternating dielectric thin films that operates on an interference effect to transmit the desired wavelengths and efficiently reflect the remainder of the input signal. This filter is analogous to an electrical bandpass filter that only allows certain frequencies to pass. The input filter 116 may have a coating on either or both surfaces to minimize undesired reflections, for example of the dropped channel in one direction, and an added channel in the opposite direction.

The selected beam's 118 angle of incidence is preferably minimized to less than 3 degrees from normal incidence to minimize displacement between the beams' exit/entrance positions and the optical axis of the input filter 116. The remaining channels of the input beam 108 are reflected off the input filter 116 at an angle essentially identical to that of the input beam. This reflected beam is then referred to as the express beam 110. The express beam 110 passes back through the GRIN lens 112 and is focused to the output fiber 104 in the ferrule 106.

The device shown in FIG. 2 does not demultiplex all channels as with conventional demultiplexers, but rather drops a selected channel from the optical signal. Furthermore, efficient reflection of the remaining channels is accomplished by positioning the wavelength selective input filter close to the input collimator, and specifically before the express beam exits the input flashlight assembly. The integration of these parts in an input flashlight assembly reduces insertion loss by minimizing the distance the express beam travels in free space, as well as reducing walk-off that may occur, thus improving the amount of light reflected back to the express port.

Figure 3A:
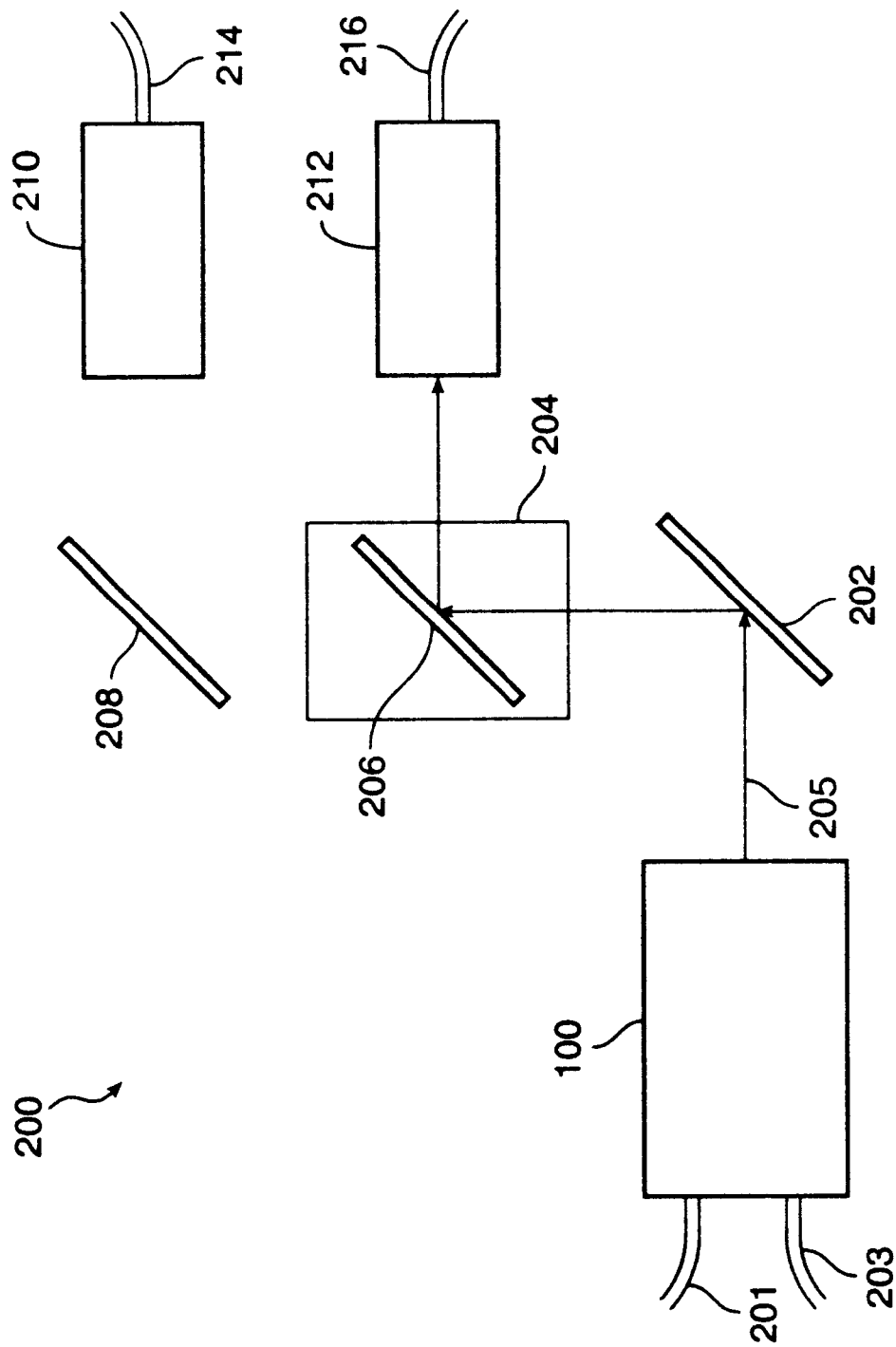
FIGS. 3A and 3B are simplified schematic diagrams of a wavelength selective switch in alternative switch positions according to an embodiment of the present invention.

FIG. 3A is a simplified schematic diagram of a wavelength selective switch 200 according to an embodiment of the present invention utilizing the input flashlight 100 described in conjunction with FIG. 2. The switch allows channels to be selected out and dropped at either of two output ports 210, 212. The output ports generally include a collimator and a ferrule holding the associated fiber(s). A filter may be included in some instances. The wavelength selective switch in FIG. 3A is configured in the shown (first) switch position to drop the selected light beam 205 to the first output port 212 by reflecting the selected light beam off of movable mirror 206, as well as a first fixed mirror 202.

Figure 3B:
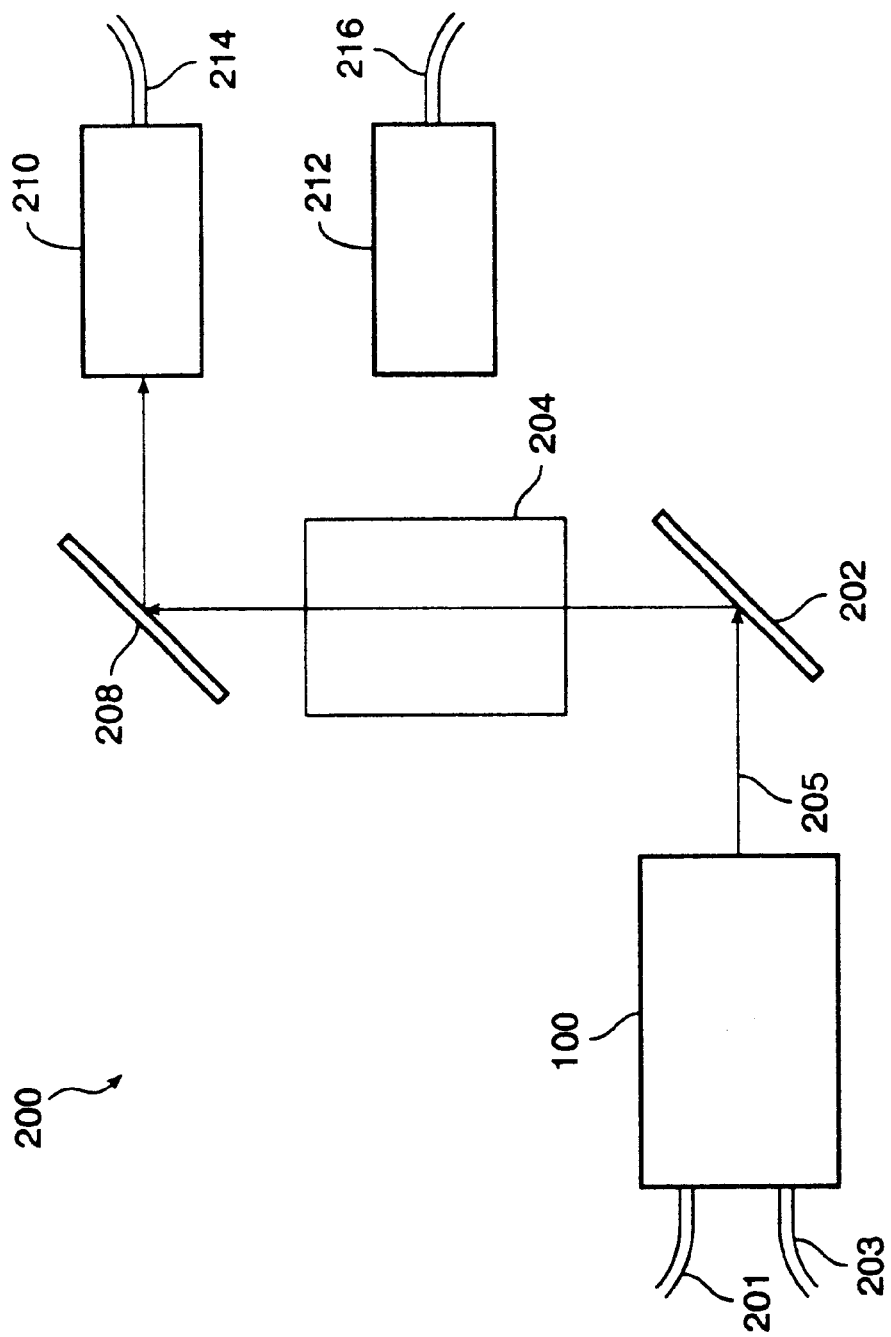

FIG. 3B shows the switch 200 in a second switch position in which the movable mirror (not shown) has been moved out of the path of the selected beam 205 to allow the beam to be reflected off of a second fixed mirror 208 to the second output port 210. The movable mirror is mounted on a translating platform 204, such as an arm that moves the mirror vertically with respect to the plane of view, a rotating armature, or a slide mechanism, for example. The translating platform 204 is connected to a translating mechanism (not shown), such as an electromechanical actuator, of which several examples are known in the art.

The switch shown in FIGS. 3A and 3B further includes an input fiber 201, an express fiber 203, output fibers 214, 216, which are generally held in ferrules to optically couple to the output ports 210, 212. Of course, optical elements other than fibers could be coupled to the ports, such as detectors or amplifiers, as discussed above. In the case where optical fibers are coupled to the output ports, collimators are typically used to focus the light onto the fiber end.

The fixed mirrors 202 and 208 and the movable mirror 206 may be composed of a reflective material capable of redirecting an optical beam of the desired wavelength(s). The mirrors are typically formed by depositing a thin film of metal, such as gold, aluminum, silver, platinum, or copper (or various metal alloys) on a substrate, such as glass. In a preferred embodiment, a layer of gold about 50–200 nm thick provides a signal loss of about 0.1 dB over the wavelengths of interest. The fixed mirrors 202 and 204 are fixed in relation to the other components of the switch. The fixed mirror 202 is positioned in a manner to redirect the selected beam 205 toward the movable mirror 206 and the other fixed mirror 208. The movable mirror 206 can be moved into and out of the selected beam 205.

Figure 3C:
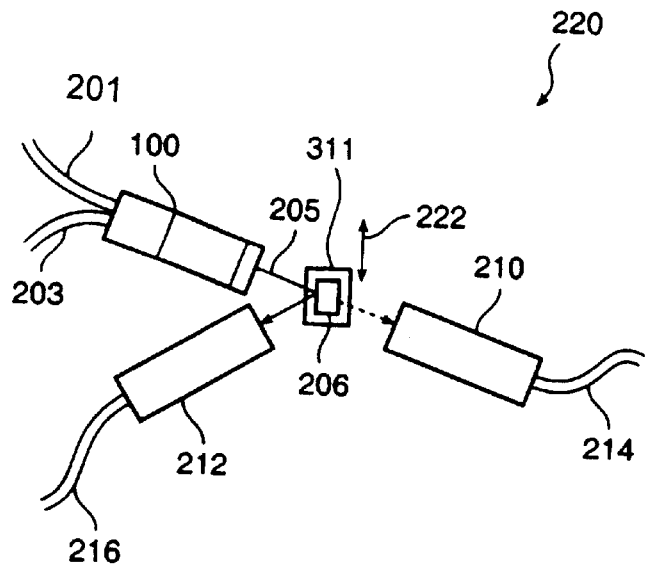
FIG. 3C is an alternative layout of an optical switch according to another embodiment of the present invention.

FIG. 3C is an alternative configuration of an optical switch 220 without the fixed mirrors described above in conjunction with FIGS. 3A and 3B. The input flashlight 100 is aligned with respect to the movable mirror 206 to reflectively couple to a first output port 212 with the mirror in position as shown. The mirror is mounted on a translating element, such as an armature 311 described in co-pending, commonly assigned U.S. patent application Ser. No. 09/454,022 entitled OPTICAL SWITCH WITH FLEXURE PIVOT by Richard Ian Seddon, filed Dec. 3, 1999, now U.S Pat. No. 6,275,624, the disclosure of which is hereby incorpora cantilever arms or slider mechanisms can be used. Movement of the mirror 206 into and out of the selected beam 205 is indicated by the double-ended arrow 222. When the mirror is moved out of the selected beam, the selected beam is optically coupled to the second output port 210 because the output port 210 is co-linear with the input flashlight so that the selected beam 205 directly enters the output port without deflection.

In operation, a user, typically through a computer, has the ability to control the switch state and thus the path of the selected (dropped) channel(s). The input fiber 201 typically contains multiple channels in a standard WDM format, although it is understood that some channels might not be occupied. The wavelength selective router 200 selects certain channels and routes them separately from the remainder of the signal, which is efficiently directed to the express path. In a typical embodiment, the express channels are reflected off the input filter and coupled to the express port with less than 0.25 dB of reflection loss. The express fiber 203 and output fibers 214, 216 may be connected to other optical devices.

Figure 4B:
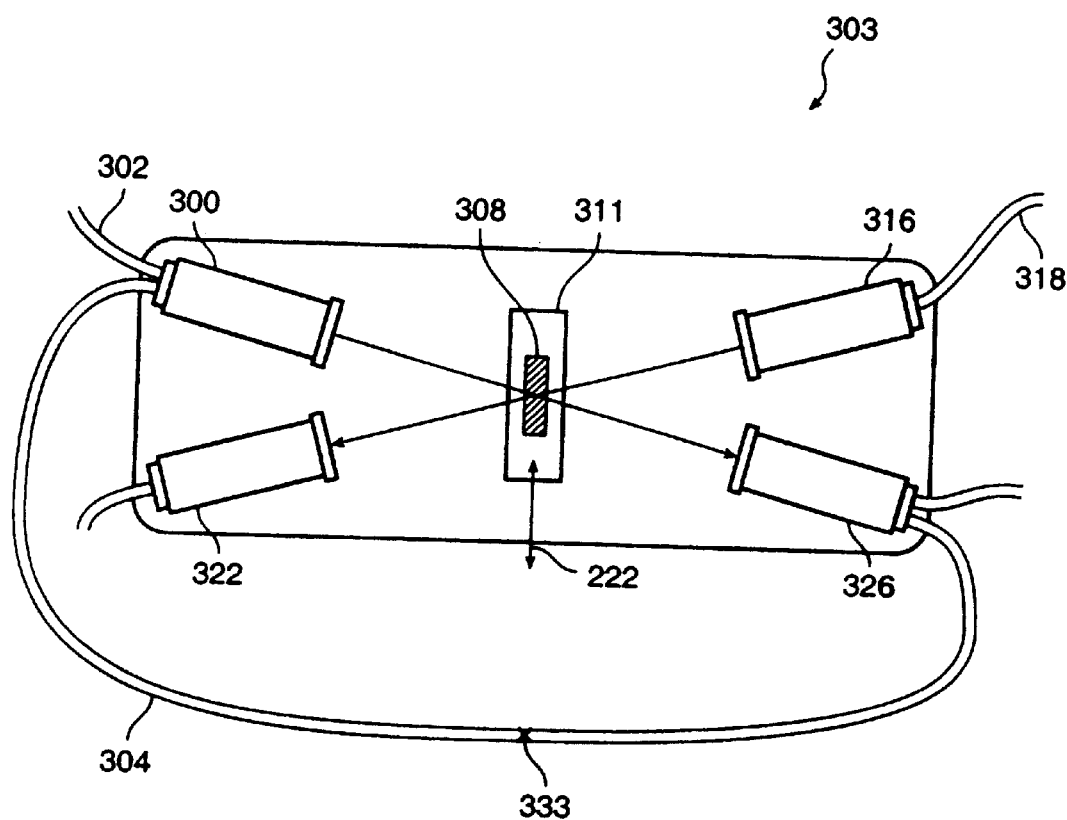
FIGS. 4A and 4B are simplified schematic diagrams of ADD/DROP configurations according to different embodiments of the present invention.
Figure 4A:
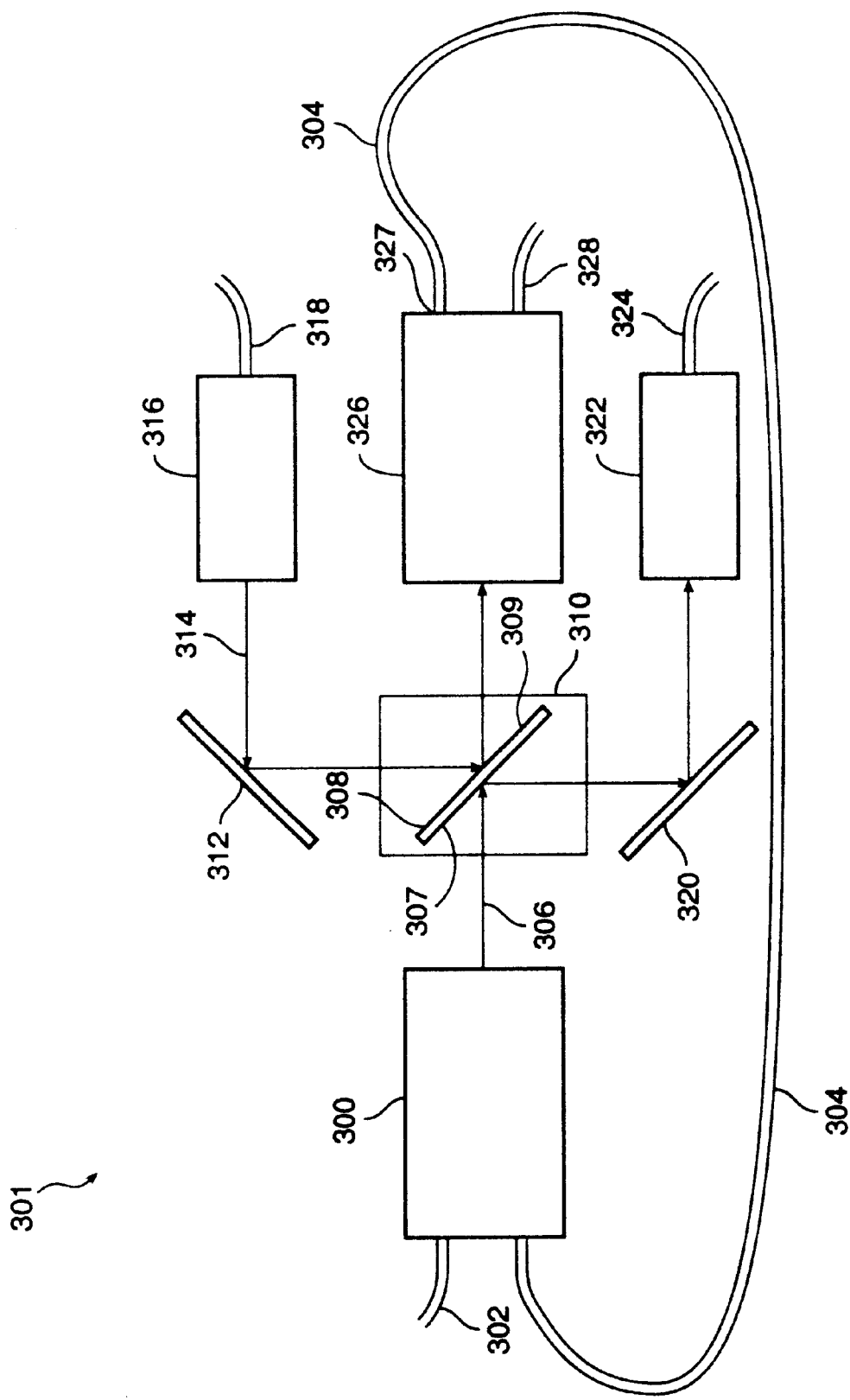

FIG. 4A is a simplified schematic diagram of a wavelength selective router 301 that allows a channel(s) to be added and dropped from the optical signal. The wavelength selective router system shown also allows channels to be added to the common optical signal. The routing system embodiment shown in FIG. 4A includes an input fiber 302, an express fiber 304, a wavelength selective input flashlight 300, a selected beam 306, a movable mirror 308, a translating platform 310, two fixed mirrors 312 and 320, an added beam 314, an ADD port 316 (for example a flashlight without a wavelength selective filter, although one may be added for channel isolation and/or noise reduction), an ADD fiber 318, a DROP port 322 (with or without a filter, as described above in conjunction with reference numeral 316), a DROP fiber 324, a wavelength selective output flashlight 326 and an output fiber 328.

The wavelength selective output flashlight is substantially similar, if not identical, to the wavelength selective input flashlight 300. The filter used in the wavelength selective output flashlight transmits the selected wavelength spectrum (provided by either the input signal or the ADD signal) while reflecting the optical signal(s) carried on the express fiber 304 to the output fiber. In some instances, the filter used in the wavelength selective output flashlight may be chosen to compliment the filter used in the wavelength selective input flashlight 300, such as by improving out-of-band rejection.

The ADD/DROP router shown in FIG. 4A operates in a similar fashion to the switch described in conjunction with FIGS. 3A and 3B. The movable mirror 308 is moved into and out of the selected beam 306 by operation of the translating platform 310. When the two-sided movable mirror 308 is in the beam path, as shown in FIG. 4A, the selected beam 306 is reflected to the DROP port 322 off of a first surface 307 of the movable mirror 308. When the movable mirror is translated out of the selected beam path, the selected beam 306 is directed (not shown) to the wavelength selective output flashlight 326. In the second case, no channels would be added or dropped to or from the optical signal arriving on the input fiber 302 and proceeding on the output fiber 328. Beam 306 is reinserted at the wavelength selective output flashlight 326 to optically couple with optical signals arriving on the express fiber 304 and be output on the output fiber 328. It is not necessary that the express port be optically coupled to a common port 327 with the express fiber 304; however, an express fiber link is an efficient way to couple the non-selected channels from the wavelength selective input flashlight to the wavelength selective output flashlight. Alternatively, the express fiber could be "broken", providing an express pigtail and a common pigtail. The common pigtail could optically couple light at non-selected wavelengths to the wavelength selective output flashlight.

In the first switch position (shown in FIG. 4A), the ADD port 316 provides an optical ADD signal 314 that is reflected off a second surface 309 of the movable mirror 308 to the wavelength selective output flashlight 326. When the movable mirror is moved out of the beam path, the ADD signal, if any, is not optically coupled to an output. With the movable mirror 308 as-shown in FIG. 4A, the selected portion of the input signal 306 is dropped to be coupled to the drop port 322, and an ADD signal 314 is coupled to the output 328 to be combined with the express signals on the express fiber 304. In this fashion, the signal-carrying capacity of the optical communication network is maintained by replacing the bandwidth dropped by the input flashlight with the ADD signal.

FIG. 4B is an alternative embodiment of the present invention configured as an ADD/DROP switch 303. The movable mirror 308 is reflective on both sides, as described above in conjunction with FIG. 4A. The movable mirror is mounted on an armature 311. The configuration of the input flashlight 300 to the DROP flashlight 322 and the output flashlight 326; and the configuration of the ADD flashlight 316 to the output flashlight, achieve the ADD/DROP function without fixed mirrors, as described in conjunction with FIG. 4A. A fusion splice 333 in the express fiber 304 allows the express fiber to be fabricated from two fiber "pig-tails" (fiber segments extending from an optical component) for ease of manufacturability.

Figure 5:
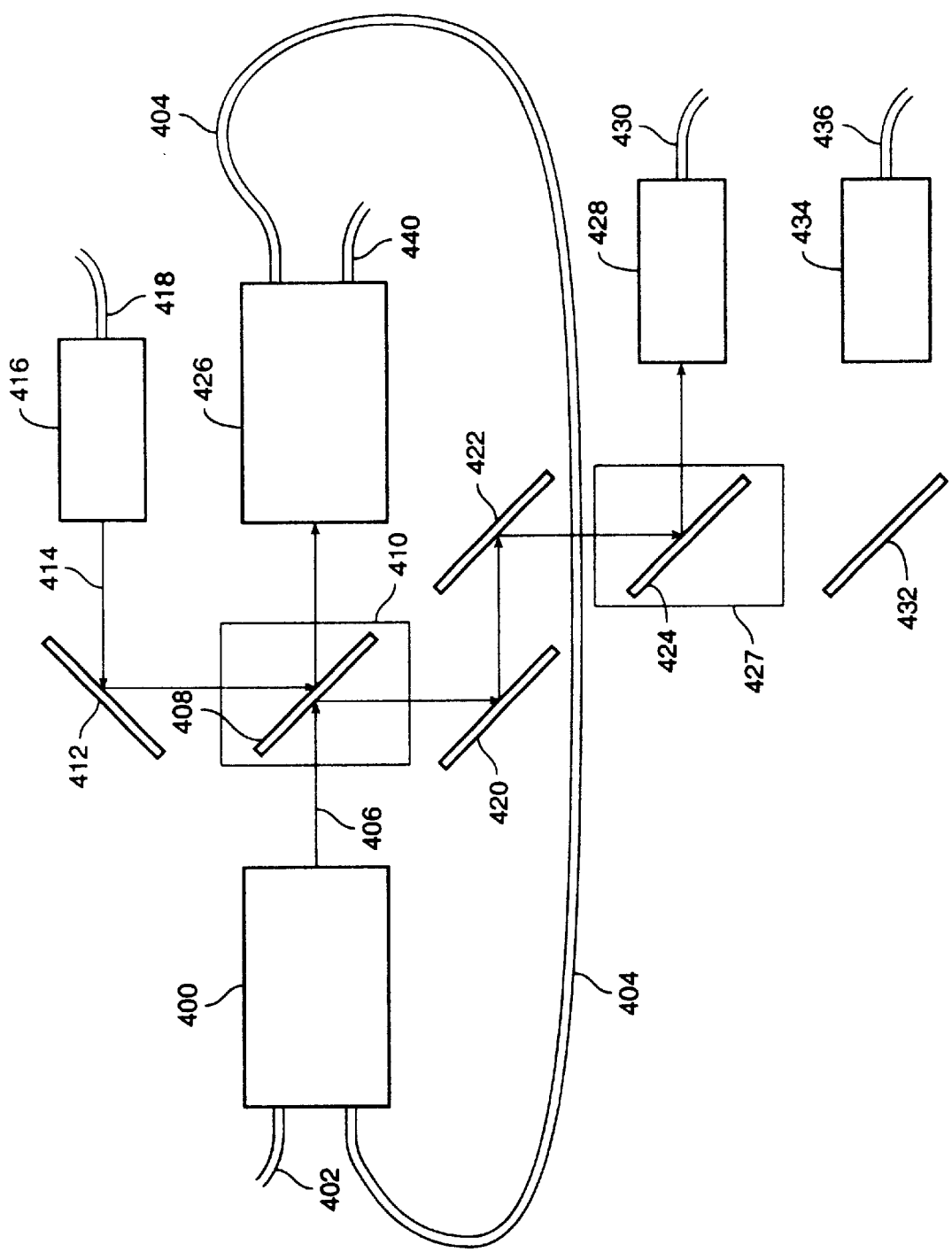
FIG. 5 is a schematic diagram of a wavelength selective router system and switch that has the capability to direct a dropped channel to either of two output ports.

FIG. 5 is a simplified schematic diagram of a wavelength selective switch that has ADD/DROP capability with the additional ability to direct the dropped signal to either of two outputs. FIG. 5 shows an input fiber 402, an express fiber 404, a wavelength selective router (input flashlight) 400, a selected beam 406, two translating mirrors 408 and 424, two translating platforms 410 and 427, four fixed mirrors 412, 420, 422 and 432, an added beam 414, an ADD port 416, an ADD fiber 418, a first DROP port 428, a second DROP port 434, a first DROP fiber 430, a second DROP fiber 436, a wavelength selective output router 426 and an output fiber 440. The wavelength selective routers are configured similarly to the router shown in FIG. 2. The input fiber 402 provides a WDM signal containing several channels, only some of which are passed by the input router to form the selected beam 406, the remainder being coupled to the express fiber 404. The output fiber 440 contains the channels provided by the express fiber, as well as the selected channels (in one switch state) or added channels (in the other switch state) to utilize the dropped segment of the spectrum.

The fixed mirrors 412, 420, 422 and 432 and the translating mirrors 408 and 424 may be composed of any material with a reflective surface that is capable of redirecting an optical beam. The first translating mirror 408 is a double-surface mirror, while the second translating mirror 424 is a single-surface mirror. The fixed mirrors 412, 420, 422 and 432 are fixed in location with respect the other components of the wavelength selective router. The fixed mirror 412 is positioned in a manner to redirect the added beam 414 from the ADD port 416 toward the first translating mirror 408, when the wavelength selective router system and switch is configured to switch, add and drop signals (the configuration shown in FIG. 5).

The fixed mirror 420 is positioned in a manner to redirect the selected beam 406 from the first translating mirror 408 to the fixed mirror 420, when the wavelength selective router system is configured to switch, add and drop signals (the configuration shown in FIG. 4). The selected beam 406 is redirected from the fixed mirror 420 to the fixed mirror 422. The fixed mirror 422 is positioned in such a manned to redirect the selected beam 406 toward the second translating mirror 424 when in the switch position shown, and toward and the fixed mirror 432 when the second translating mirror is moved out of the path of the selected beam 406.

The second translating mirror 424 can be translated into multiple locations with respect to the other components of the switch. In the configuration shown in FIG. 5, the second translating mirror 424 is positioned to redirect the selected beam 406 towards the output port 428. The second translating mirror 424 may be translated out of the selected beam's 406 path allowing the selected beam to reach the fixed mirror 432 to be reflected to output port 434. The translating mirrors 408, 424 may be translated into multiple locations with respect to the other components of the switch.

When the first translating mirror 408 is configured in the manner shown in FIG. 5, the wavelength selective router system and switch is configured to switch, add and drop channels from the WDM signal. The first translating mirror 408 may also be translated out of the selected beam's 406 path (not shown) to allow all channels in the WDM signal to pass through the wavelength selective router system and switch. The translating platforms 410 and 427 are composed of a substantially rigid material such as metal, plastic, or the like. The translating platforms 410 and 427 are connected to separate translating mechanisms or actuators (not shown), to allow direction of the selected beam 406 to either of the DROP ports 428, 434.

In operation, the wavelength selective router system and switch shown in FIG. 5 selects out certain channels from the common WDM signal and delivers the selected channels to either DROP fiber 430 or DROP fiber 436. The wavelength selective router system and switch also has the capability to add new channels to the common WDM signal that is sent out the output fiber 440. The input fiber 402 contains multiple channels in a WDM format. The wavelength selective router 400 selects a certain channel or channels and routes them separately from the remainder (express portion) of the signal.

When the wavelength selective router system and switch is configured to add and drop channels (position of translating mirror 408 shown in FIG. 5) and the wavelength selective router system and switch is configured to drop channels at the first DROP port 428, the second translating mirror 424 will direct the selected beam toward that port. On the other hand, when the wavelength selective router system and switch is configured to add and drop channels (position of translating mirror 408 shown in FIG. 5) and the wavelength selective router system and switch is configured to drop channels at the second DROP port 434, (i.e. the second translating mirror 424 will be translated out of the selected beam's 406 path, not shown), the fixed mirror 432 will direct the selected beam 406 toward the second DROP port 434.

New channels may be added by inputting them from add fiber 418. ADD port 416 collimates the added channel(s) into add beam 414. The add beam 414 is reflected off of fixed mirror 412 and the "back" surface of the first translating mirror 408 to the wavelength selective output router 426. It is possible to only drop channels, without adding additional signals, if desired, by not providing an ADD signal. If it is desired to neither DROP or ADD channels, then the first movable mirror 408 is simply translated out of the path of the selected beam 406, allowing it to couple to the wavelength selective output router 426.

Figure 6:
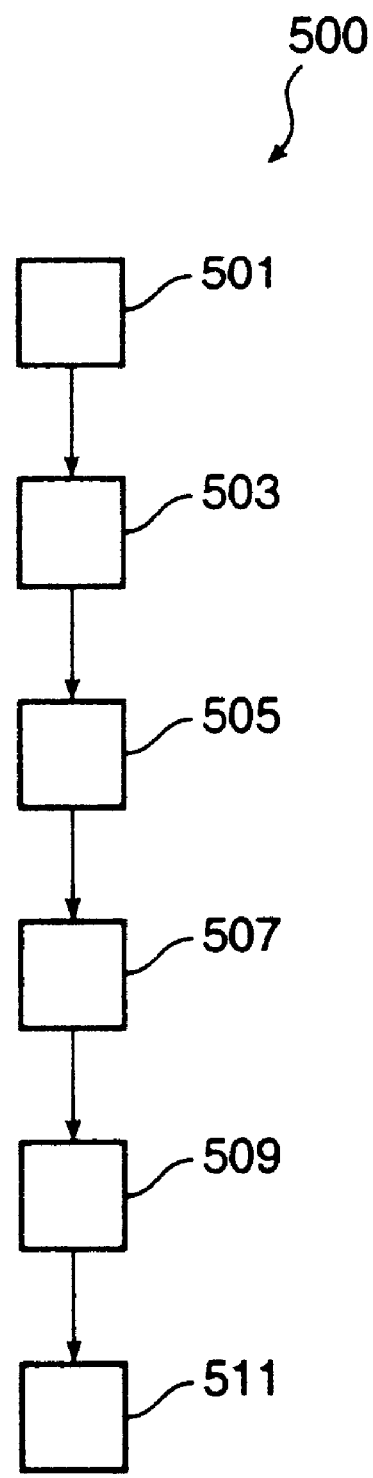
FIG. 6 is a simplified flow chart of a process for routing a selected optical channel according to an embodiment of the present invention.

FIG. 6 is a simplified flow chart of a process 500 for routing a selected optical channel according to an embodiment of the present invention. A multi-channel input signal is provided at an input port (step 501). The multi-channel input signal is expanded in a collimator to form a multi-channel optical beam (step 503). The multi-channel optical beam is directed at a wavelength selective input filter that transmits a selected channel beam and reflects the remaining channels in the optical beam (step 505). The remaining channels are focused to optically couple to an express port (step 507). The selected channel beam is directed at an optical switching element that directs the selected channel beam to a second collimator that focuses the selected channel beam to optically couple to a first output port (step 509). The optical switching element is then switched to optically couple the selected channel beam to a third collimator that focuses the selected channel beam to optically couple to a second output port (511).

The invention may be embodied in other specific forms without departing from its spirit or essential characteristics. The described embodiments are to be considered in all respects only as illustrative and not restrictive. For example, alternative configurations of ports and collimators may be possible. The scope of this invention is, therefore, indicated by the appended claims rather than by the foregoing description. All changes which come within the meaning and range of equivalency of the claims are the be embraced within their scope.

What is claimed is:

1. An optical switch comprising:
   a hybrid input flashlight assembly (100) including
   an input port configured to receive an input optical signal containing a plurality of optical channels,
   a collimator disposed between the input port and
   a wavelength selective filter, the wavelength selective filter being disposed to optically couple at least one selected channel from the plurality of optical channels along a selected beam (205) and to optically couple a remainder of the plurality of optical channels to
   an express port;
   a movable optical element (206) capable of selectively directing the selected beam to one of
   a first output collimator configured to focus the selected beam to a first output port (212) and
   a second output collimator configured to focus the selected beam to a second output port (210).

2. The optical switch of claim 1 wherein one of the first output collimator and the second output collimator are co-linear with the hybrid input flashlight assembly.

3. The optical switch of claim 1 wherein the movable optical element is a mirror.

4. An optical switch comprising:
   a hybrid input flashlight assembly (100) including
   an input port configured to receive an input optical signal containing a plurality of optical channels,
   a collimator disposed between the input port and
   a wavelength selective filter, the wavelength selective filter being disposed to optically couple at least one selected channel from the plurality of optical channels along a selected beam (205) and to optically couple a remainder of the plurality of optical channels to
   an express port;
   a mirror (206) capable of selectively directing the selected beam to one of
   a first output port (212) and
   a second output port (210), wherein the selected beam optically couples to the first output port (216) from the mirror when the optical switch is in a first switch position placing the mirror in the selected beam without further beam direction, and optically couples to the second output port (210) directly from the hybrid flashlight assembly without further beam direction when the switch is in a second position removing the mirror from the selected beam.

5. The optical switch of claim 4 wherein one of the first output port and the second output port are co-linear with the hybrid input flashlight assembly.

6. An optical ADD/DROP router comprising:
   a hybrid input flashlight assembly (300) including
   an input port configured to receive an input optical signal containing a plurality of optical channels,
   a collimator disposed between the input port and
   a wavelength selective filter, the wavelength selective filter being disposed to optically couple at least a selected channel from the plurality of optical channels along a selected beam (306) and to optically couple a remainder of the plurality of optical channels to
   an express port;
   a mirror (308) having a first reflective surface (307) and a second reflective surface (309) capable, in a first switch position, of directing the selected beam by reflection off of the first reflective surface to a DROP port (322) and directing an ADD beam (314) to a hybrid output flashlight assembly (326) by reflection off of the second reflective surface, and, in a second switch position, of optically coupling the selected beam directly to the hybrid output flashlight assembly without reflection off of the mirror.

7. The optical ADD/DROP router of claim 6 further comprising:
   a common port optically coupled to the express port with
   an express fiber (304), the common port being optically coupled to
   a second wavelength selective filter disposed in the hybrid output flashlight, the second wavelength selective filter being capable of transmitting either of the selected beam and the ADD beam to
   an output port, and reflecting a common signal carried on the express fiber to the output port.

8. An optical ADD/DROP router comprising:
   a hybrid input flashlight assembly (300) including
   an input port configured to receive an input optical signal containing a plurality of optical channels,
   a collimator disposed between the input port and
   a first wavelength selective filter, the first wavelength selective filter being disposed to optically couple at least a selected channel from the plurality of optical channels along a selected beam (306) and to optically couple a remainder of the plurality of optical channels to
   an express port;
   a mirror (308) having a first reflective surface (307) and a second reflective surface (309) capable, in a first switch position, of directing the selected beam by reflection off of the first reflective surface to a DROP port (322) and directing an ADD beam (314) to
   a hybrid output flashlight assembly (326) by reflection off of the second reflective surface, and, in a second switch position, of optically coupling the selected beam directly to the hybrid output flashlight assembly without reflection off of the mirror, the hybrid output flashlight assembly including
   a common port,
   an output port,
   a second collimator, and
   a second wavelength selective filter, the second wavelength selective filter being capable of transmitting either of the selected beam and the ADD beam to the output port, and reflecting a common signal present at the common port to the output port.

9. A process for routing a selected optical channel from a multi-channel optical input, the process comprising steps of:
   providing a multi-channel input signal at an input port;
   expanding the multi-channel input signal in a collimator to form a multi-channel optical beam;
   directing the multi-channel optical beam at a wavelength selective input filter to transmit a selected channel beam and to reflect a remaining channel portion of the multi-channel optical beam;
   focusing the remaining channel portion to optically couple to an express port;
   directing the selected channel beam at an optical switching element that further directs the selected channel beam to a second collimator that focuses the selected channel beam to optically couple to a first output port; and switching the optical switching element to directly couple the selected channel beam to a third collimator that focuses the selected channel beam to optically couple to a second output port.

10. A hybrid wavelength selective router comprising:

an input port configured to receive an optical signal containing a plurality of optical channels;

a collimator (112) optically coupled to the input port in a hybrid assembly (100); and a bandpass filter (116) optically coupled to the collimator in the hybrid assembly, the bandpass filter being disposed to transmit a selected portion of the optical signal through free space along an optical beam path and to reflect a remaining portion of the optical signal back through the collimator to an output port wherein the bandpass filter transmits a plurality of adjacent optical channels.

11. The hybrid wavelength selective router of claim 10 wherein the bandpass filter transmits four adjacent optical channels.

12. A hybrid wavelength selective router comprising:

an input port configured to receive an optical signal containing a plurality of optical channels;

a collimator (112) optically coupled to the input port in a hybrid assembly (100); and a bandpass filter (116) optically coupled to the collimator in the hybrid assembly, the bandpass filter being disposed to transmit a selected portion of the optical signal through free space along an optical beam path and to reflect a remaining portion of the optical signal back through the collimator to an output port wherein the optical beam path forms an angle of incidence with the bandpass filter of less than 3 degrees from normal.

13. A hybrid wavelength selective router comprising:

an input port configured to receive an optical signal containing a plurality of optical channels;

a collimator (112) optically coupled to the input port in a hybrid assembly (100); and a bandpass filter (116) optically coupled to the collimator in the hybrid assembly, the bandpass filter being disposed to transmit a plurality of adjacent optical channels of the optical signal through free space as an optical beam, the optical beam forming an angle of incidence of less than 3 degrees from normal with the bandpass filter, and to reflect a remaining portion of the optical signal back through the collimator to an output port.

* * * * *